July 25, 1933.                T. R. ROBERTS                1,919,748
                                 SAW
                    Filed March 25, 1933        2 Sheets-Sheet 1
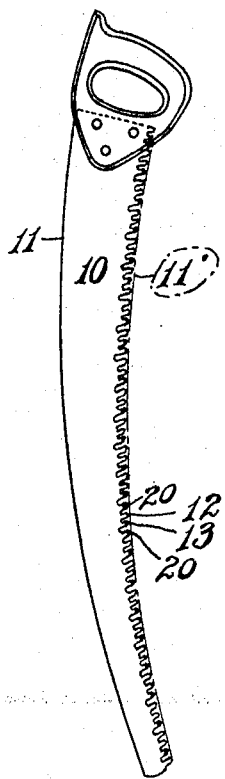
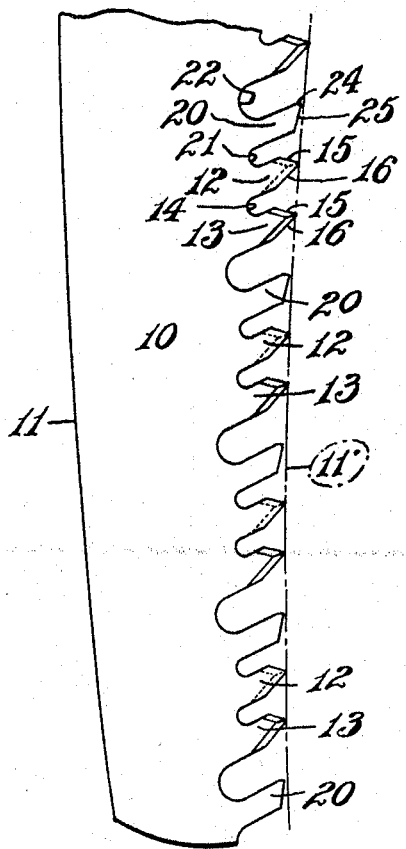
INVENTOR.
Tom R. Roberts,
BY
Hood & Hahn.
ATTORNEYS July 25, 1933.   T. R. ROBERTS   1,919,748
SAW
Filed March 25, 1933    2 Sheets-Sheet 2
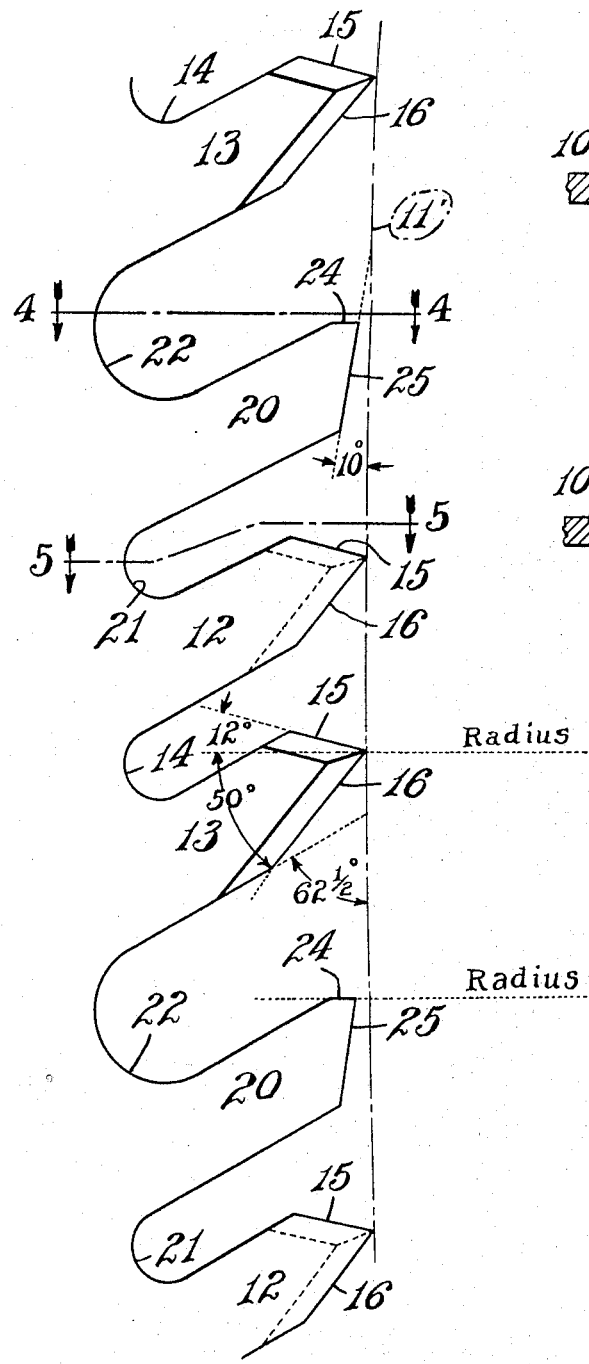
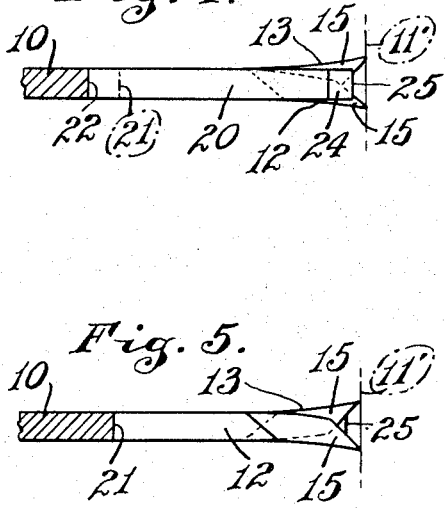
INVENTOR.
Tom R. Roberts,
BY
Hood + Hahn.
ATTORNEYS Patented July 25, 1933

1,919,748

UNITED STATES PATENT OFFICE

TOM R. ROBERTS, OF INDIANAPOLIS, INDIANA, ASSIGNOR TO E. C. ATKINS AND COMPANY, OF INDIANAPOLIS, INDIANA, A CORPORATION OF INDIANA

SAW

Application filed March 25, 1933. Serial No. 662,715.

The object of my invention is to produce a pruning saw of the pull stroke type wherein the teeth are so formed as to be much more efficient, as to accuracy, cutting speed, and avoidance of digging and riding, whereby the operator is able to cut at higher speed with less likelihood of jerking himself from unavoidable precarious footings, than with saws of previously known tooth formation.

The general advantages of the pull stroke and curved blade, for pruning saws, are, of course, well known but such saws have heretofore possessed comparatively slow cutting speed and considerable difficulties have been experienced because they have had a decided tendency to ride out of the kerf on the push stroke. These difficulties have been eliminated in my saw solely as a result of the formation of teeth having the specific novel characteristics to which I shall call attention.

The accompanying drawings illustrate my invention:

Fig. 1 is a side elevation of a saw embodying my invention;

Fig. 2 is an enlarged fragmentary elevation of a portion of the blade;

Fig. 3 is a very much enlarged fragmentary side elevation of a tooth group;

Fig. 4 is a section on line 4—4 of Fig. 3; and

Fig. 5 is a section on line 5—5 of Fig. 3.

In the drawings 10 indicates the blade having the arc-shaped back 11 and the tips of the cutting teeth 12, 13 lying in a curve 11' preferably of the same radius as the back but struck from a different center so that the heel of the blade is wider than the tip, as shown in the drawings.

The cutting teeth 12 and 13 are arranged in pairs separated by a shallow narrow gullet 14 and these teeth are slightly oppositely set at their tips in a well known manner.

For convenience of description, and in view of the fact that the saw is of the pull stroke type, I shall refer to the handle end of the saw as the forward end and the tip as the rear end.

Each tooth 12 and 13 is provided with a forward cutting chisel edge 15 which lies preferably at an angle of about twelve degrees forwardly inclined from the radius of curve 11' struck through the point of the tooth. I have found in practice that a plus or minus variation of not more than six degrees is permissible, without too seriously interfering with the efficiency of the saw but that a close approximation to the above-described twelve degrees of forward inclination is the most efficient.

Each tooth 12 and 13 is also provided with a rearwardly presented chisel edge 16 which most efficiently lies at a rearwardly inclined angle of approximately fifty degrees from the above-mentioned radius. I have found that as to this inclination there may be a variation of somewhere in the neighborhood of eight degrees plus or minus without serious detriment but there should be no greater variation.

Adjacent teeth 12 and 13 are filed so that their chisel edges are oppositely presented upon opposite sides of the plane of the saw.

The gullet 14 is about half the width of the teeth 12 and 13 and in front of each tooth 12 is raker tooth 20 separated from the tooth 12 by a gullet 21 similar to gullet 14.

The gullets are inclined at an angle of approximately sixty-two and one-half degrees from the curve 11' for most efficient operation although there may be a reasonable plus or minus variation.

Between the forward edge of each raker tooth 20 and the rear of each cutting tooth 13 is a relatively deep and wide gullet 22, said gullet being preferably at least twice the width of gullets 12 and 21. The tips 23 of the raker teeth 20 should in no case lie beyond curve 11' but, instead, should fall somewhat short of said curve. In practice I have found that in a saw having a 54" radius for curves 11 and 11' and a blade approximately 27" from tip to heel, the tips of the raker teeth should be approximately 0.022" short of curve 11'. Tip 23 is formed by the forward surface 24 which is normal to the plane of the saw and the rear surface 25 which is also normal to the plane of the saw. The surface 24 is most efficiently radial to curve 11' and should have a radial extent of not less than one-sixteenth of an inch, in the above-mentioned size saw. There may be a plus or minus departure from radiality of not more than five degrees as a forward inclination tends to cause the saw to ride on the forward pull stroke and the rearward inclination tends to cause the saw to dig.

The surface 25 is most efficient at an angle of about ten degrees from the adjacent portion of curve 11'. There may be a plus or minus variation of approximately five degrees in this angle. Plus variation from this angle increases riding of the saw on the back (push) stroke and negative variation decreases this riding quality and either variation is detrimental. A variation of more than five degrees plus or minus decreases the efficiency of the saw to such an extent as to render it so inefficient as to be practically useless.

Care must be exercised not to too greatly increase the radial dimension of the surface 24 although there may be some variation at this point, because increased radial dimension of surface 24 can only be attained by decreased length of surface 25 and if the surfaces 25 are too short the saw will not ride properly on the forward stroke.

The set of teeth 12 and 13 should be comparatively light and in actual practice I have found that for a blade which is 0.049 inches thick a very efficient set is 0.020.

The fundamental characteristics of my saw are the rearward inclinations of the gullets and the substantially radial forward faces 24 of the raker teeth which are most efficient when combined with the specified filing of the chisel teeth 12 and 13.

I claim as my invention:

1. A saw of the pull-stroke type having a toothed edge comprising successive tooth groups, each of said groups comprising two tandem oppositely-filed chisel teeth and a trailing raker tooth separated by gullets inclined toward the back and tip of the saw, each of the chisel teeth having a forward and a rear cutting edge inclined in opposite directions from a line normal to the tooth-tip line and through said tip, and the angle between said normal line and the forward cutting edge being substantially less than the angle between said normal line and the rear cutting edge, and each of the raker teeth having a tip lying short of the line of chisel teeth tips and formed by two planes each normal to the plate plane, the forward one of said planes being substantially normal to the adjacent tooth-tip line and leading to a gullet inclined toward the blade tip and back, and the rearward one of said planes inclined rearwardly and toward the back of the saw, and having a length substantially greater than the length of its companion tip-forming plane.

2. A saw having the characteristics specified in claim 1 and wherein the gullets lie at an angle approximating $62\frac{1}{2}°$ from the adjacent tooth-tip line.

3. A saw having the characteristics specified in claim 1 and wherein the front and rear chisel edges of the chisel teeth lie respectively approximately 12° and 50° from a line through the tip and normal to the adjacent tooth-tip line.

4. A saw having the characteristics specified in claim 1 and wherein the gullets lie at an angle approximating $62\frac{1}{2}°$ from the adjacent tooth-tip line, and the front and rear chisel edges of the chisel teeth lie respectively approximately 12° and 50° from a line through the tip and normal to the adjacent tooth-tip line.

TOM R. ROBERTS.